H. F. V. MEURLING.
HYDRANT.
APPLICATION FILED AUG. 29, 1911.
1,036,674.
Patented Aug. 27, 1912.
2 SHEETS—SHEET 2.
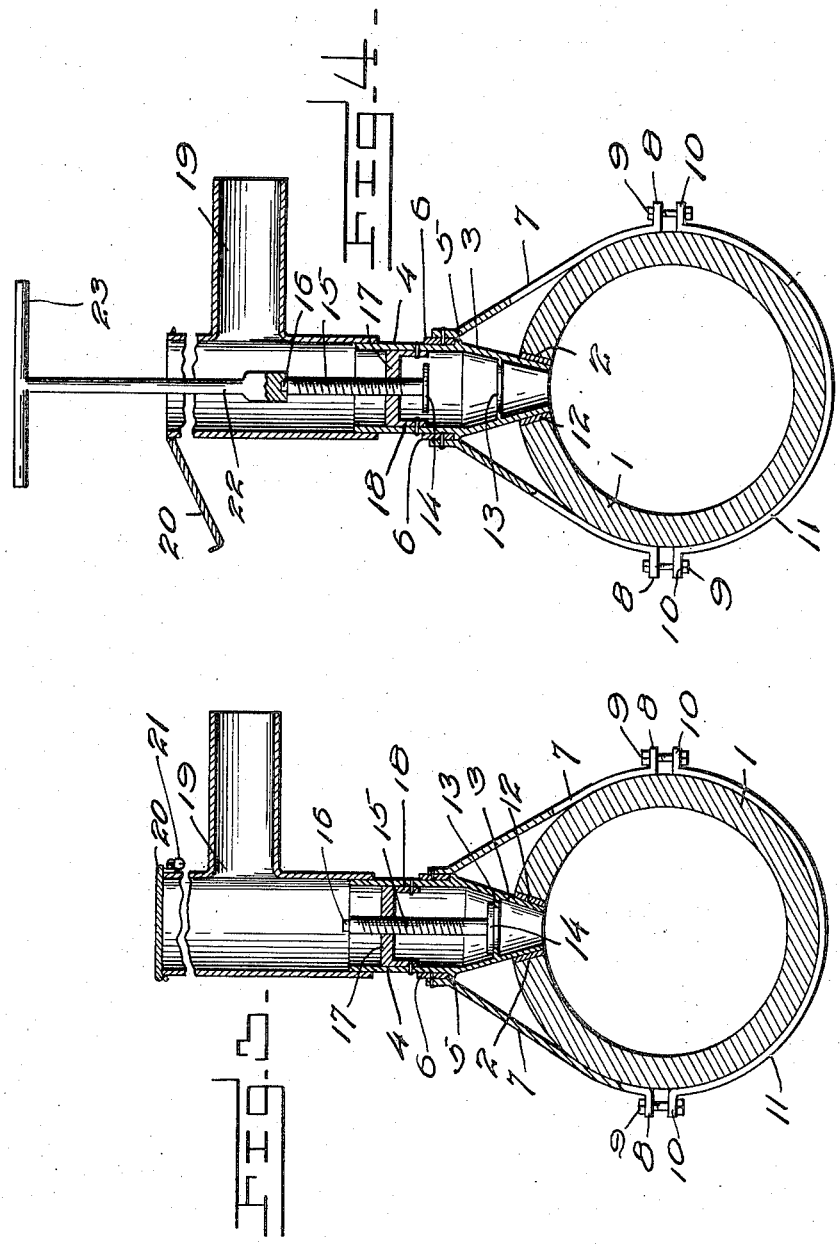

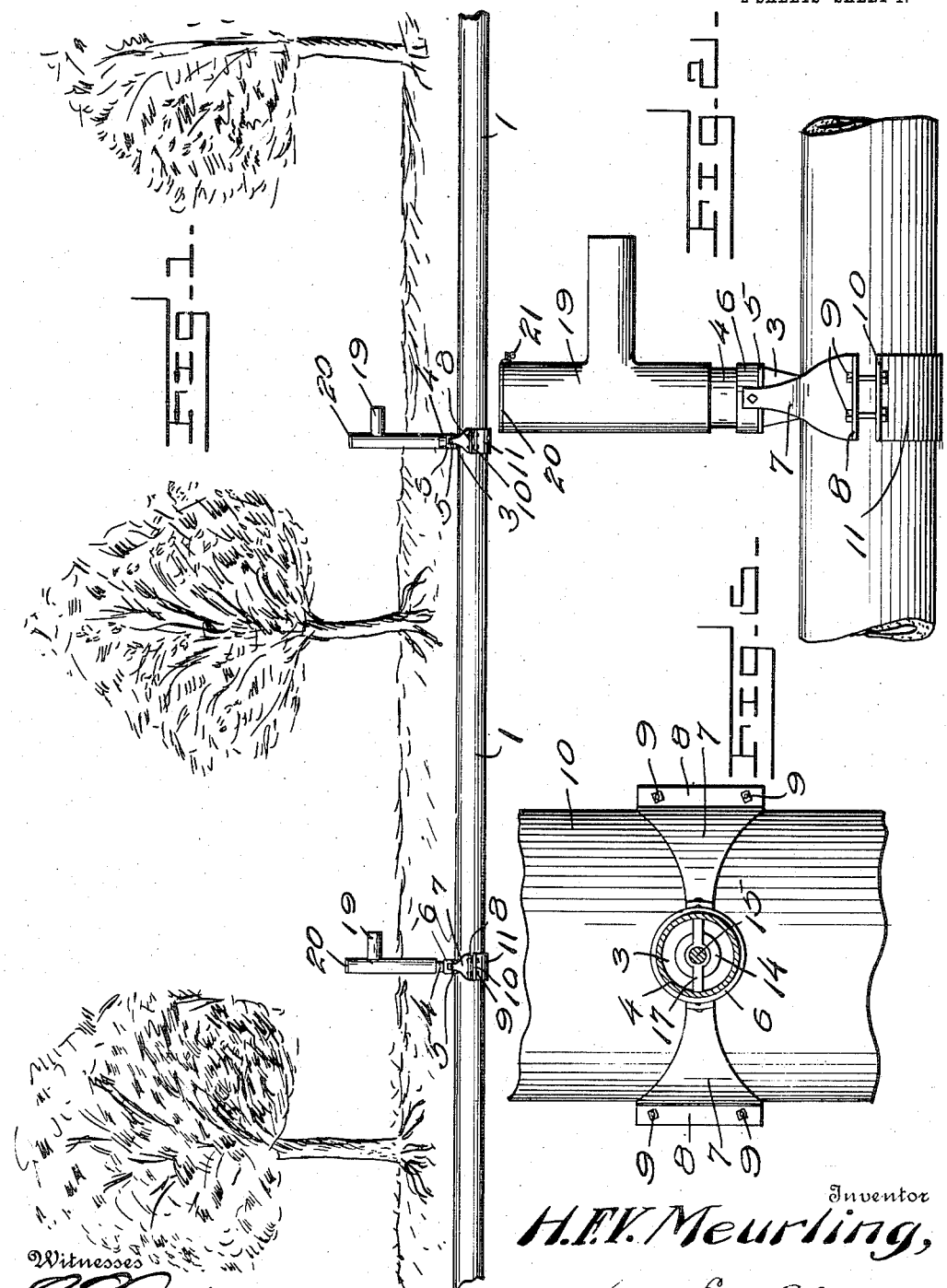

UNITED STATES PATENT OFFICE.

HARRY FREDRIK VICTOR MEURLING, OF KELOWNA, BRITISH COLUMBIA, CANADA.

HYDRANT.

1,036,674.  Specification of Letters Patent.  Patented Aug. 27, 1912.

Application filed August 29, 1911. Serial No. 646,564.

*To all whom it may concern:*

Be it known that I, HARRY F. V. MEURLING, a subject of the King of Sweden, residing at Kelowna, in the Province of British Columbia and Dominion of Canada, have invented certain new and useful Improvements in Hydrants, of which the following is a specification.

My invention relates to improvements in hydrants, and has particular reference to an improved form of water controlling plug or hydrant particularly adapted for ready insertion in a concrete or other similar water conducting pipe.

The leading object of my invention is the provision of a device of this sort which may be readily fitted in an opening tapped in the pipe without necessitating the forming of a special section in the pipe to receive the lower end of a hydrant.

The further object of my invention is the provision of a hydrant of this character which may be quickly and readily secured in position on the pipe and will serve to satisfactorily control the flow of water therefrom and to prevent unauthorized turning on of the water.

Other objects and advantages of my improved hydrant will be readily apparent by reference to the following description taken in connection with the accompanying drawings, and it will be understood that I may make any modifications in the specific structure shown and described within the scope of my claims without departing from or exceeding the spirit of the invention.

Figure 1 represents a view of an orchard having my hydrant placed therein. Fig. 2 represents a side elevation of a pipe with my hydrant applied thereto. Fig. 3 represents a vertical sectional view. Fig. 4 represents a similar view showing the valve open, and the controlling key in engagement with the valve rod, and Fig. 5 represents a transverse sectional view of one of the hydrants.

In the drawings, the numeral 1 designates a pipe of concrete or other similar substance such as is employed to conduct water under low pressure for irrigation purposes, said pipe having a sector shaped portion cut therefrom to provide the frusto-conical shaped aperture 2 into which the lower end of my hydrant fits. Fitting into the said aperture 2 of the pipe is the lower end of the frusto-conical shaped portion 3 of the cylindrical casting 4, the intersection of the portions 3 and 4 being formed with a circumferential rib or flange 5. To secure the lower section of my hydrant in position, I mount thereon the collar 6 which bears against the rib 5, while secured to the sides of said collar are the flaring brace plates 7 having the end flanges 8 through which pass the tightening bolts 9 also engaged in the end flanges 10 of the semicircular clamp band 11 which passes around the under portion of the pipe 1. It will thus be seen that my hydrant section may be readily inserted in the aperture 2 and the band 11 placed in position and connected with the braces 7, and the said lower section may then be rotated within the collar 6 as a guide until in desired position, when the tightening of the bolts 9 will draw said lower section tightly into the aperture 2, a packing ring or gasket 12 being interposed between the face of the aperture and the end 3 to make a water tight joint therebetween. Said frusto-conical portion 3 is formed with the inwardly projecting rib 13 which provides a seat for the valve 14 secured on the lower end of the threaded valve rod 15 which has the squared upper end 16. A bar 17 extends diametrically of the upper portion 4 and has downwardly curving ends 18 which are secured to the portion 4, said bar having a central threaded aperture in which the threaded portion of the valve rod is engaged.

Suitably secured on the upper end of the portion 4 of my device and making a water tight joint therewith is the T-shaped pipe member 19, one arm of the head of the T being connected to my hydrant base while the other arm has hinged thereto the cover 20 normally secured in closed position by the padlock 21, the opening of the cover permitting of the introduction of the shank 22 of the valve operating key having the cross head 23 to facilitate ready turning thereof. The stem of the T projects laterally and is adapted to serve as a discharge spout for water passing upward in the hydrant.

From the foregoing description taken in connection with the accompanying drawings, the construction of my improved irrigation hydrant will be readily understood, and it will be seen that turning of the valve rod 15 will unseat the valve 14 to allow water from the pipe 1 to pass upward and out of the discharge spout of the hydrant, the water pressure being insufficient to cause the water to well or gush out from the top of the hydrant. It will further be observed that I have provided a simple and inexpensive and durable hydrant which may be quickly and readily inserted in an ordinary concrete irrigation conduit without necessitating any peculiar construction of the said conduit, which hydrant may be readily locked to prevent turning on of the same or may be readily unlocked and opened to allow the water to flow and which will be thoroughly efficient in every particular.

I claim:

1. The combination with a water conduit, of a hydrant base having its lower end fitting into the side of the pipe and having a peripheral rib formed thereon, a collar rotatably mounted on the base above the rib, flaring brace members secured to the collar and having outwardly extending end flanges, a clamp band fitting around the under portion of the pipe and having outwardly extending end flanges, and clamp bolts connecting the end flanges of the band and braces for drawing the same together to secure the base to the pipe.

2. The combination with a conduit, of a hydrant base fitting into the conduit, said base being formed with an inwardly extending rib and an outwardly extending rib, means passing around the pipe and engaging the outwardly extending rib for securing the base to the conduit, and a valve mounted in the hydrant and adapted to seat against the inwardly extending rib to shut off flow through the hydrant.

In testimony whereof I affix my signature, in the presence of two witnesses.

HARRY FREDRIK VICTOR MEURLING.

Witnesses:
 ANTHONY TEMPLE,
 JOHN FORD BURNE.